(12) United States Patent
Huth

(10) Patent No.: US 6,845,471 B1
(45) Date of Patent: Jan. 18, 2005

(54) APPARATUS FOR AND METHOD OF ACTION SYNCHRONIZATION FOR SOFTWARE REPRODUCIBILITY

(75) Inventor: Jerome Richard Huth, San Jose, CA (US)

(73) Assignee: Solid Step Software, Campbell, CA (US)

( * ) Notice: Subject to any disclaimer, the term of this patent is extended or adjusted under 35 U.S.C. 154(b) by 637 days.

(21) Appl. No.: 09/797,797

(22) Filed: Mar. 2, 2001

Related U.S. Application Data

(60) Provisional application No. 60/188,134, filed on Mar. 8, 2000.

(51) Int. Cl.[7] .............................................. G06F 11/00
(52) U.S. Cl. ........................................ 714/39; 714/38
(58) Field of Search .............................. 714/38, 39, 45, 714/46; 719/318; 717/124, 125, 127, 128, 131, 132, 133; 709/318

(56) References Cited

U.S. PATENT DOCUMENTS 5,758,062 A * 5/1998 McMahon et al. ............ 714/38
6,408,403 B1 * 6/2002 Rodrigues et al. ............ 714/38

OTHER PUBLICATIONS

"Ration Visual Test 6.5," www.rational.com/products/visual-test/indes.jsp.
"WinRunner," www.mercuryinteractive.com.
"C++Test," www.parasoft.com.
Edward Kit, "Integrated, Effective Test Design and Automation," Software Development, Feb., 1999.
James A. Whittaker, "What is Software Testing? And Why is it So Hard?," IEEE Software, Jan./Feb. 2000.
"Cigital Software Confidence for the Digitial Age—Services," www.cigital.com/services.

* cited by examiner

*Primary Examiner*—Scott Baderman
(74) *Attorney, Agent, or Firm*—Haverstock & Owens LLP

(57) ABSTRACT

A method of and apparatus for action synchronization for software reproducibility adds stability and control to software quality. The method and apparatus records a plurality of non-file events and a plurality of file events from a computer application. A serial event log allows sequential replaying of events which occurred during a failed run of a software application.

48 Claims, 8 Drawing Sheets

Fig. 5

APPARATUS FOR AND METHOD OF ACTION SYNCHRONIZATION FOR SOFTWARE REPRODUCIBILITY

RELATED APPLICATION(S)

This Patent Application claims priority under 35 U.S.C. 119(e) of the co-pending U.S. Provisional Patent Application, Ser. No. 60/188,134, filed Mar. 8, 2000, and entitled "PROCESS FOR ACTION SYNCHRONIZATION FOR SOFTWARE REPRODUCEABILITY". The Provisional Patent Application, Ser. No. 60/1188,134, filed Mar. 8, 2000, and entitled "PROCESS FOR ACTION SYNCHRONIZATION FOR SOFTWARE REPRODUCEABILITY" is also hereby incorporated by reference.

FIELD OF THE INVENTION

This invention relates to the field of software systems. More particularly, this invention relates to the field of testability-enabled feedback for control and stability in software systems.

BACKGROUND OF THE INVENTION

In traditional manufacturing environments, where an assembly line builds some quantity of physical things, product quality is predicated in part on inspection and the ability to actually touch, see, feel and otherwise examine the final product. Many other quality control techniques are based on this fundamental ability.

In software development much attention has been given to the many elements that contribute to the creation and deployment of a software system. Such elements are all part of a "software assembly line" that makes up the processes that software developers use when developing and deploying a software system. But what has long been ignored is the fact that software products are themselves assembly lines and an important aspect is whether an application performs correctly for the user, in their environment, with their specific inputs, in the exact way in which they use the application. Every time the user runs the application, they are using the software assembly line to manufacture another final product through a specific run of the application. Although the software may work perfectly in some situations, it can fail completely in others, just as some products that come off a traditional assembly line may be within specifications while others may be completely or partially unusable.

In order to enable inspection on the application assembly line, which provides the basis for immense software quality improvements, applications must have an attribute of reproducibility. In other words, applications must have an ability to recreate any and all specific runs of the application. Unfortunately, with conventional software, a system evaluator must re-enter the user data in the proper sequence to debug a failure. One measure of testability for software is how easily a specific run of the software system can be reproduced.

The software developers have adopted various methodologies to aid in the software product development process. One principle of many of these techniques, requirements-based design and code reuse, has had an enormous impact especially on the design and implementation phases of development. However, when it comes time to test and release a software product, there often is a disconnect between the product's functional requirements and the product itself because there are no commercially available software testing products that deliver any real measure of testability for software products. Software companies must rely largely on the sheer quality of their programming talent to verify the functional integrity of any final product. Thus, software companies are understandably cautious when hiring, because the software development process currently is so sensitive to the quality and skill levels of each individual developer on the team.

Feedback is one attribute that enables hardware engineers to easily control and stabilize the system, in many classes of hardware systems (amplifiers, control systems, etc.). In software systems, testability, which enables feedback, is largely absent. As software applications grow in complexity, both in size and in their interconnections with other applications, the need for strong feedback in the system also grows.

In software systems, testability is one measure of how easily an application can be made to reproduce any specific run of the software system, or how easily feedback can be enabled in the system. FIG. 1 depicts one example of a current software test system. Although commercial black-box 28 software test products such as this are available, they all suffer from the fact that while they can reproduce some runs of an application 22, typically with a considerable amount of effort, they do not actually increase the testability of the application 22 at all. If a real user experiences a failure in the application, it doesn't matter how many canned test scripts have been created for the application. If the application is not testable it simply will not be able to recreate the conditions and actions that make up the specific run of the application 22 that failed for the user. Additionally, such a system 20 utilizing a black-box 28 test method requires a test engineer to learn a new scripting language 24 as well as undertake continuous maintenance 26 to insure the black-box 28 is functioning properly.

What is needed is an application that enables feedback with near insignificant effort by the application programmer to allow the application programmer to easily control and stabilize the software system. What is also needed is a software testing technology that enables complete Push-Button Reproducibiity™ for any software system, even those with asynchronous properties such as Graphical User Interfaces (GUI) or distributed processes, with an insignificant amount of effort by the application programmer.

Additionally, a "white box" testing solution is needed that enables zero-effort Push-Button Reproducibility™ and testability for any software system. In effect, what is needed is an application that adds feedback to the software development process, bridging the gap between the promise of requirements-based design and the realities of software testing and maintenance. What is needed is an application to make a software system easy to test and verify, allowing companies to reap the rewards of code reuse without worrying if some change in one section of code is going to cause failures when that code is used in another part of the program.

Solving these problems would allow companies to stop relying on the sheer magnitude of their programmers' talent for software verification, so that even new college graduates can easily contribute to the software development process. While it may take a recent graduate longer than a more experienced engineer, the final product will be of the same quality in that testing and verification is no longer a function of the programmer's skill level.

SUMMARY OF THE INVENTION

The present invention includes a method of action synchronization for software reproducibility to add stability and control to software quality. The invention provides for recording a plurality of non-file events and a plurality of file events from a run of a computer application. The recorded events allows playing each event from a serial event log to recreate a run of the application, events from a computer application, the method includes storing a plurality of non-file events in the serial event log. When recording one of a plurality of file events from a computer application, the method includes copying a plurality of file events to an I/O file bundle and storing the file events in the serial event log.

Later, when playing the next event from the serial event log, the method calls an onplayback function of the next event when the next event is a basic synchronous event. The basic synchronous event is deleted. Then, a file map is updated with a next event when the next event is a file event. Once updated, the file event is deleted. When the next event is a human playback event, a gate is closed. An onhuman playback function of the human playback event is called and then, the human playback event is deleted. An oncleared function is called when a notification is received. The notification is then deleted. When the next event is one of the plurality of non-file events the gate is closed and then the next event is saved.

When playing the next event from the serial event log, the method also comprises opening the gate when the next event is an inter process event notification. Next, the oncleared function of a saved inter process event is called, wherein the saved inter process event corresponds with the inter process event notification. The saved inter process event and the inter process event notification are deleted. When inter process event notification has not been received, the inter process event notification is saved. The method further comprises opening the gate when a user completes the human playback event. A filename is obtained to which an input filename maps. An original offset is removed from the filename and adding a current offset to the filename and returning the filename.

The present invention also includes an article of manufacture such as a floppy, CD Rom, zip disk or the like, which includes a computer readable medium bearing program code embodied for use with a computer. The computer program code includes an ability to record a plurality of non-file events and a plurality of file events from a computer application and for playing each event from a serial event log. When recording one of a plurality of non-file events from a computer application, the article of manufacture stores the one of a plurality of non-file events in the serial event log, allows copying the one of a plurality of file event to an I/O file bundle and for storing the one of a plurality of file events in the serial event log.

When playing the next event from the serial event log, the article of manufacture allows for calling an onplayback function of the next event when the next event is a basic synchronous event. The basic synchronous event is then deleted. A file map is updated with the next event when the next event is a file event. The file event is then deleted. A gate is closed when the next event is a human playback event. An onhuman playback function of the human playback event is called and then deleted. An oncleared function is called when a notification is received and then deleted. When the next event is one of the plurality of non-file events the gate is closed and then saved.

When playing the next event from the serial event log, the article of manufacture also provides for opening the gate when the next event is an inter process event notification. The oncleared event of a saved inter process even is called, wherein the saved inter process event corresponds with the inter process event notification. The saved inter process event and the inter process event notification are then deleted. When the inter process event notification has not been received, the inter process event notification is saved. The gate is opened when a user completes the human playback event. A filename is obtained for mapping an input filename. An original offset from the filename is removed and a current offset is added to the filename and the filename returned.

The present invention also includes an apparatus for action synchronization for software reproducibility to add stability and control to software quality comprising a storage media for storing a computer application, a processing unit coupled to the storage media and a user interface coupled to the processing unit such that a user can record a plurality of non-file events and a plurality of file events from the computer application and subsequently play a next event from a serial event log.

DETAILED DESCRIPTION OF THE PREFERRED EMBODIMENT

Figure 1:
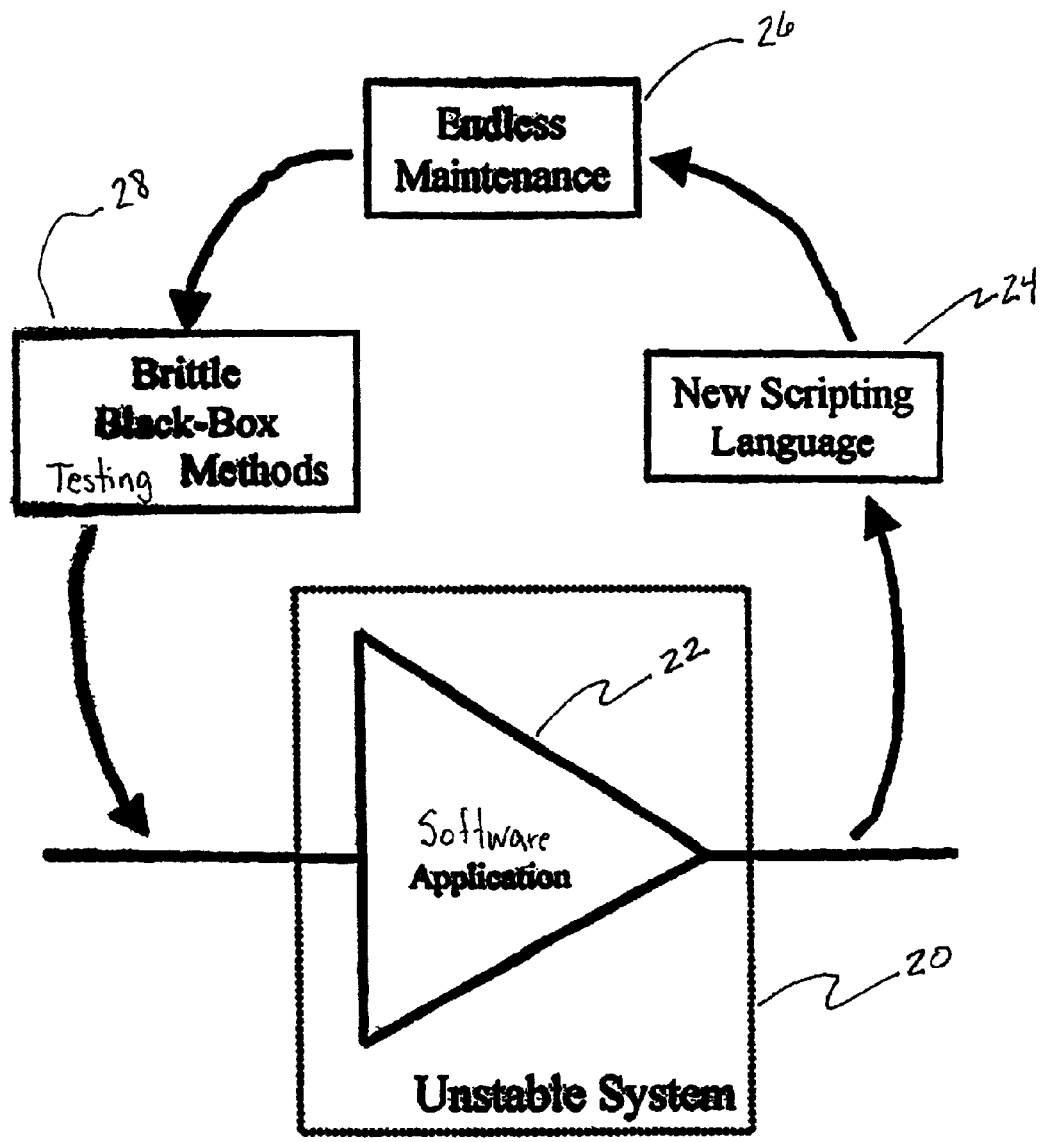
FIG. 1 illustrates a block diagram of a "black box" testing method of the prior art.
Figure 2:
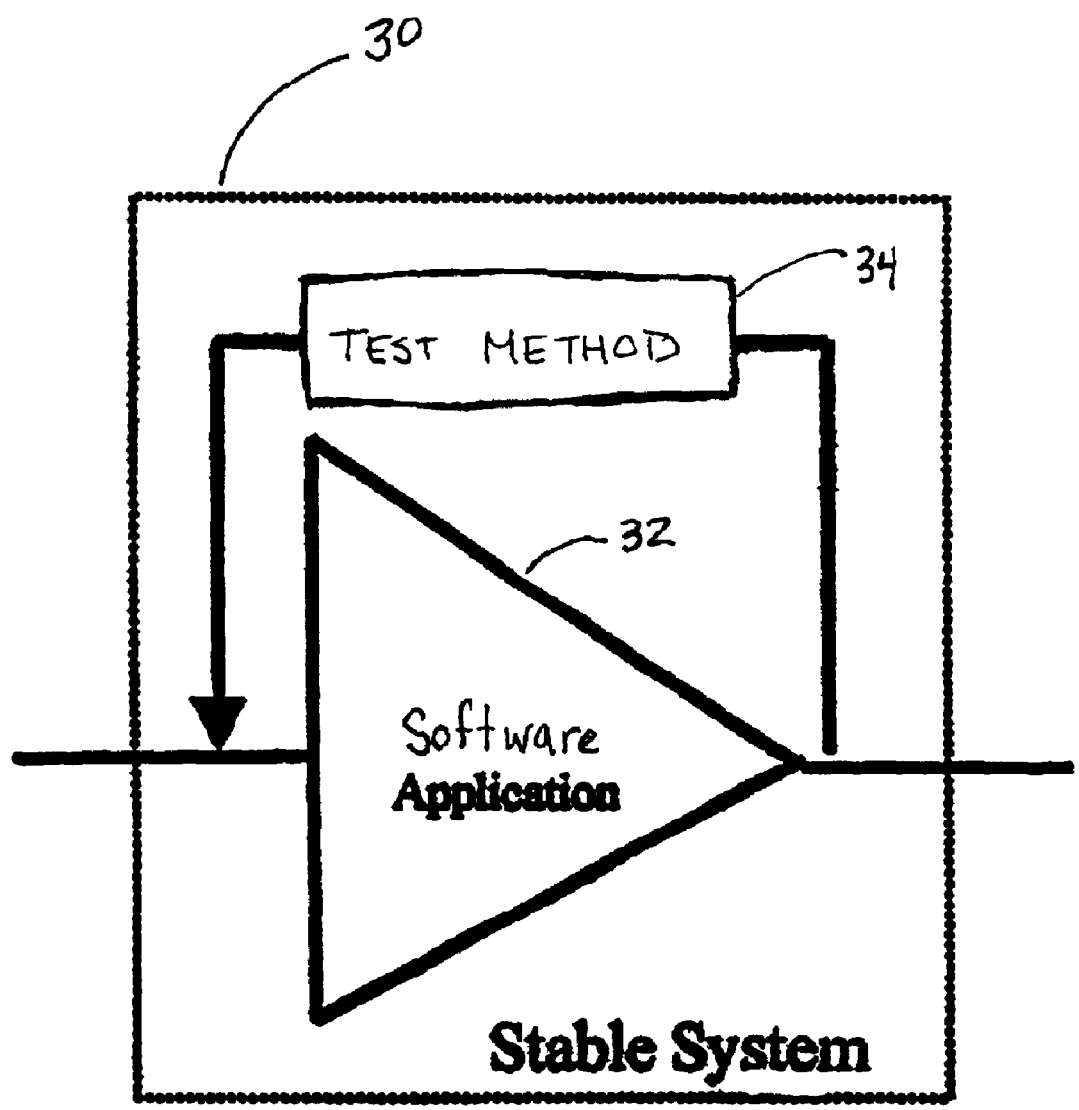
FIG. 2 illustrates a block diagram of the preferred embodiment of the present invention.

Referring to FIG. 2, the preferred embodiment of the present invention includes a method 34 enabling maximal automatic feedback to the software application 32 in the software development process. It also serves to provide maximal control and stability for the software system 30. The method 34 will enable maximal feedback in the software system, and thus will deliver maximally stable software systems 30.

Figure 3:
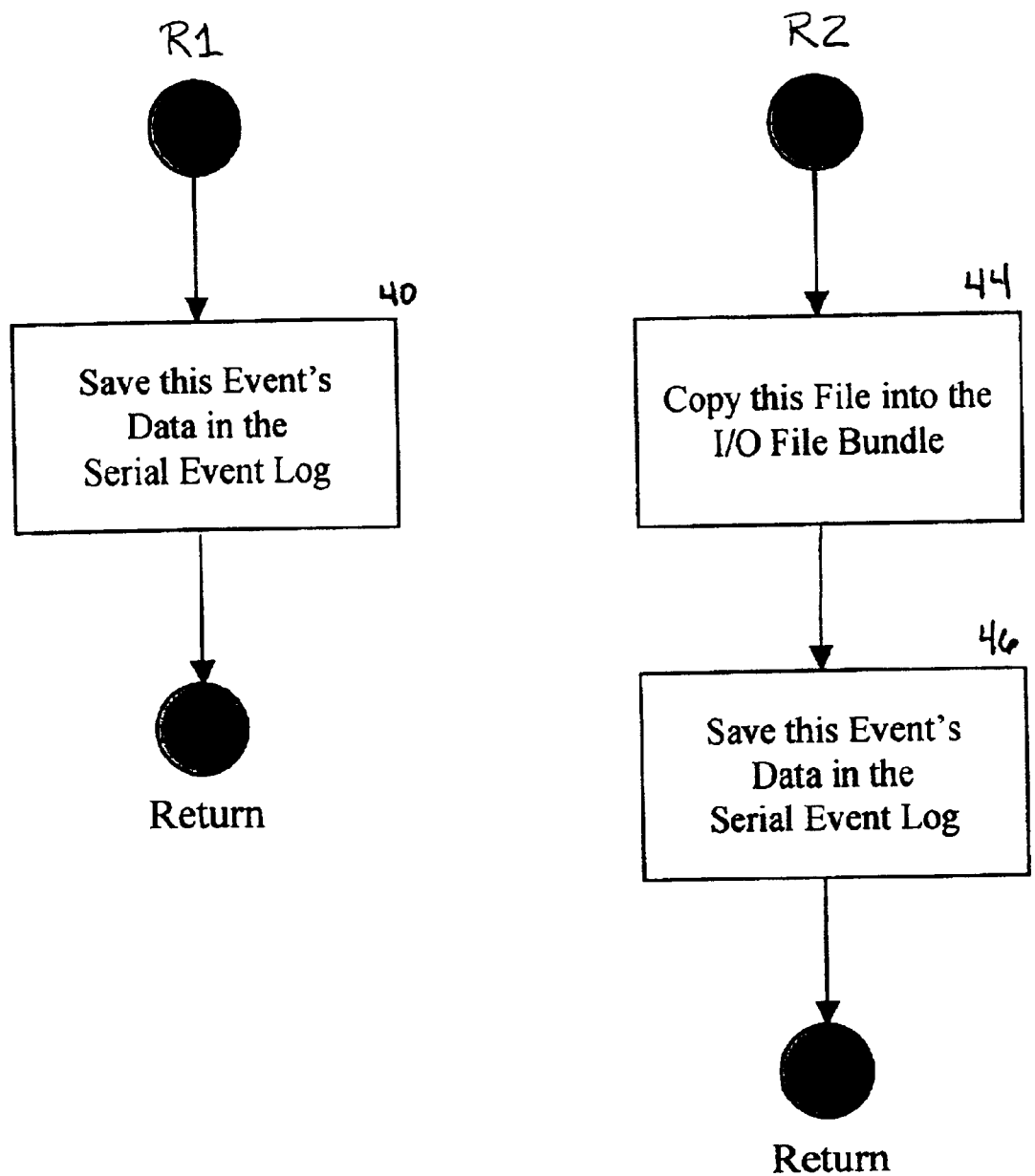
FIG. 3 illustrates the preferred action synchronization recording method of the present invention.
Figure 4:
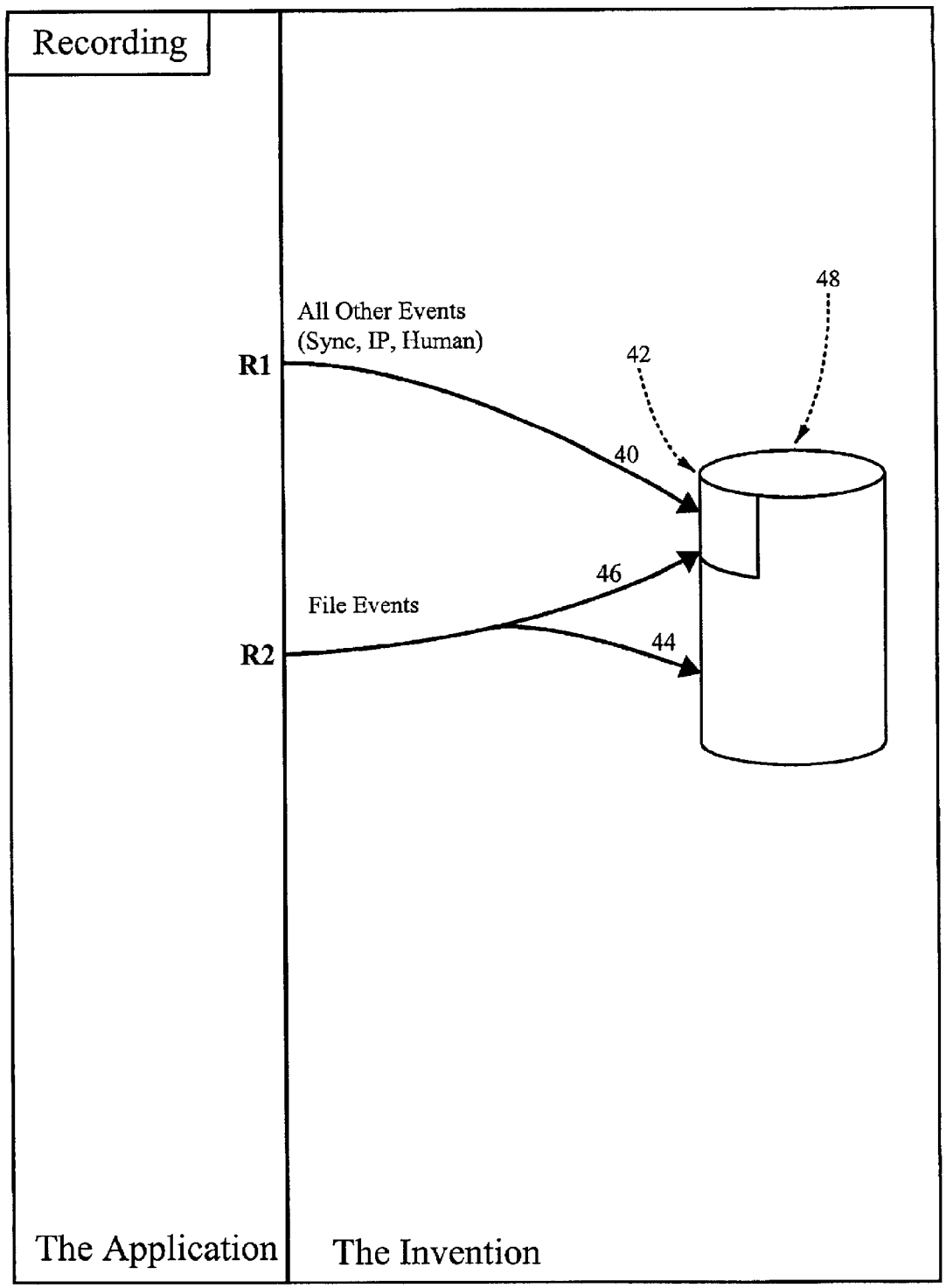
FIG. 4 illustrates the preferred apparatus for the action synchronization recording method of the present invention.

Referring to FIGS. 3 & 4, the preferred embodiment of the present invention includes the Non-File Event Function R1, which is called to record non-file events as they happen when the application is running. In the preferred embodiment of the present invention, each non-file event's data is stored 40 in the Serial Event Log 42. Also in the preferred embodiment, each event is a sub-class of an SstAction, and the member variables of the class are simply written to the file using a standard data serialization mechanism. Although this Non-File Event Function R1 is very simple, and treats all non-file events the same way, during playback these events are played back differently, as discussed later in this application.

Still referring to FIGS. 3 & 4, the File Event Record Function R2 is called to record file events when the application reads any end-user data files. During the File Event Record Function R2, a copy is made of the file that the application is going to read and stores it 44 in an I/O File Bundle 48. Then, the file event's data is stored 46 in the Serial Event Log 42. The data stored includes the filename that the application reads, and the filename of the copy stored 44 in the I/O File Bundle 48. As will be discussed later, these two filenames are used to update a file map table during a playback operation.

Figure 5:
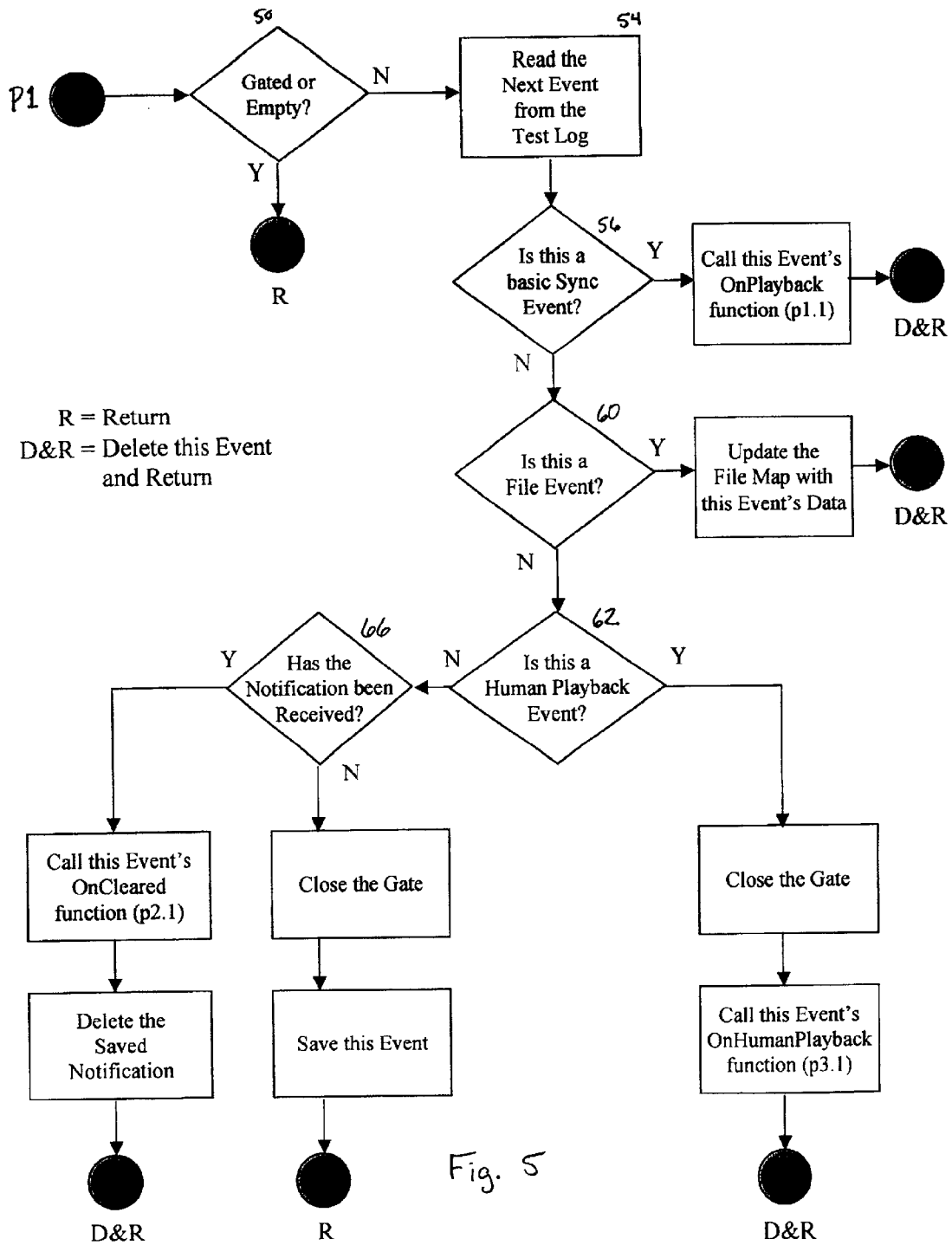
FIGS. 5–7 illustrate the preferred action synchronization playing method of the present invention.
Figure 8:
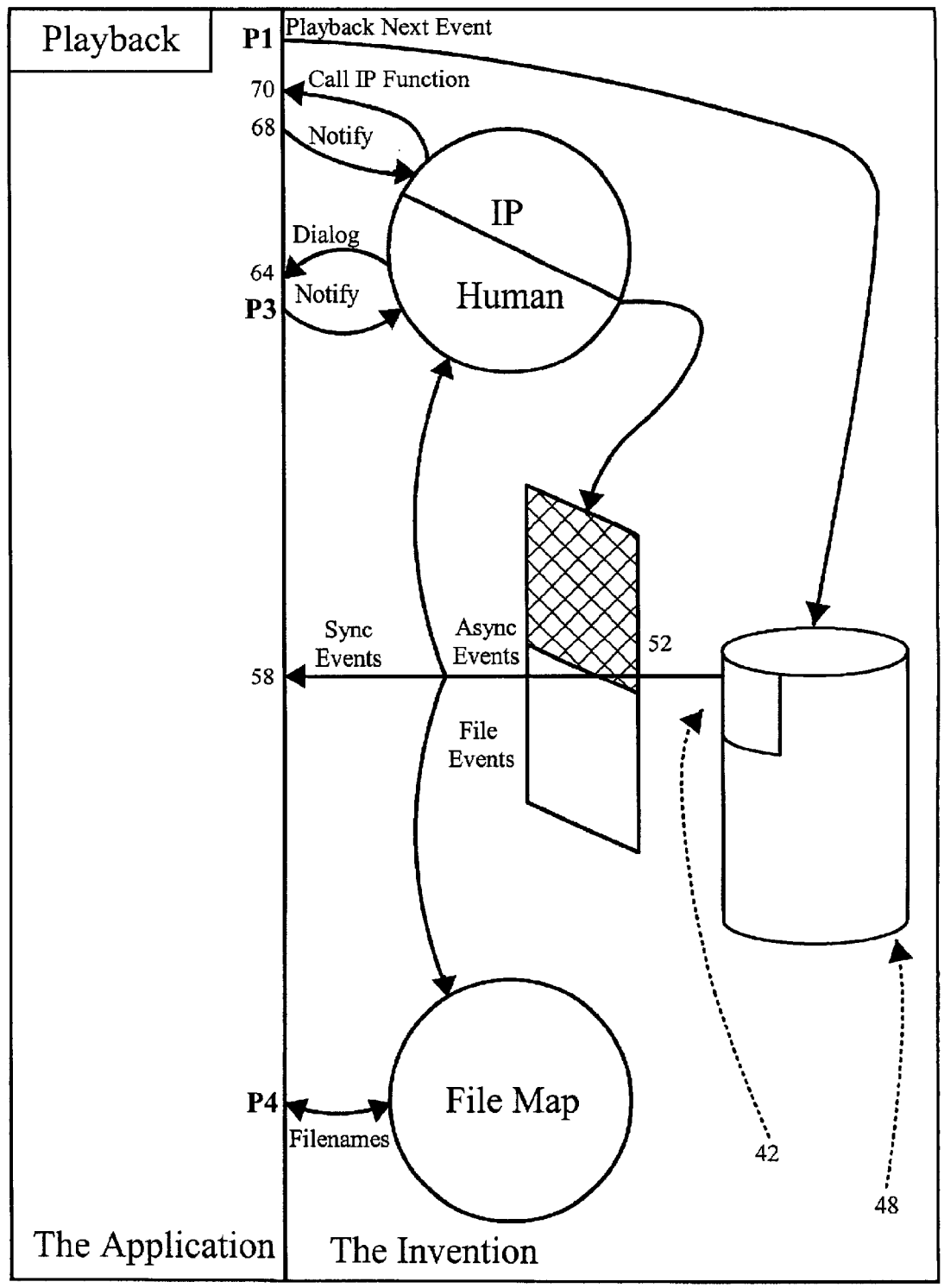
FIG. 8 illustrates the preferred apparatus for the action synchronization playing method of the present invention.

Referring now to FIGS. 5 & 8, the preferred embodiment of the present invention includes a Play Next Event Function P1. The application calls the Play Next Event Function P1 to read and playback the next event which is stored in the Serial Event Log 42. This Play Next Event Function P1 is the most complicated of the functions that make up the software reproducibility process. However, this Play Next Event Function P1 does not completely define the process because of its asynchronous nature. The complete process is defined by all four of the functions discussed herein.

Referring again to FIGS. 5 & 8, on Initial Playback Inquiries 50 function includes two questions. The first question is: "Is the event log empty?" or "Have we already read and played all of the events?" 50. If the Serial Event Log 42 is empty then there is no need to do anything except return.

The second question is: "Is the Gate closed?" If the Gate 52 is closed, then we will not read and playback any more events from the Serial Event Log 42 until the Gate 52 is opened again. The Gate 52 is the part of the process which guarantees reproducibility even for software applications that contain asynchronous properties.

Referring again to FIGS. 5 & 8, if neither of the Initial Playback Inquiries 50 are true, then the next event in the Serial Event Log 42 is read 54. Each event in the Serial Event Log 42 has a unique ID. The unique ID can be a String, as in the preferred embodiment. Alternatively, the unique ID can be an Integer if disk space is a major concern. The unique ID identifies the application callback function that is to be called by the process when each event is played back. The event also contains the "instance-specific" data such as a string or integer that identifies the specific menu item to be activated. Other data is also possible. The instance specific data completely defines the callback function and how to play back the current event. For instance, there may be hundreds of simple menu items in a GUI application. Each of the menu items could use the same type of event (i.e. call the same function on playback) but would store different instance-specific data.

In the next step of the preferred embodiment of the present invention, a Sync Event Question 56 occurs. Here the application determines: "Is this a simple (application-defined) synchronous event?" If yes, then an application-defined function 58 is called to play back this event. The application-defined function 58 is passed the application-defined data that was stored in the Serial Event Log 42 during the original run of the program.

Next, the File Event Inquiry 60 determines: "Is this a File Event?" File events are created when the original run of the application reads or writes a user-data file. File events include at least two pieces of data: the filename that the application read or wrote during the original run of the program and the filename to which the process was copied during the original run of the application in the File Event Record Function R2.

If the current event is a file event, then the application will use the data stored corresponding to the current event to maintain a hash table that simply relates the filename accessed during the original run of the program to the filename of the copy that was created during the original run of the application.

Still referring to FIGS. 5 & 8, if the event is not a file event, then it must be an asynchronous event. Because an asynchronous event can occur at any time the system might be required to wait before proceeding. In such a case it may cause the Gate 52 to close. The Human Playback Event Inquiry 62 now determines: "Is this a Human Playback event?" Human playback events are events which require a human being to actually perform the event's actions during playback. A Human Playback event can be an application functionality that is not especially useful for functions such as printing which normally do not affect the end-user's data, but may be required for any other parts of the application that may not be automatically replayable.

When a human playback event is read from the Serial Event Log 42, the Gate 52 is closed because no events are allowed to be played back until a human has performed the required human playback action. After the Gate 52 closes, the On Human Playback Virtual Function 64 of the event is called. For a typical (GUI) application, this will simply display a dialog that instructs the user to perform the action that was performed during the original run of the application, and then press "Resume" when finished. The Resume button of the dialog then calls the Gate Open Function P3, which will be discussed in greater detail below.

A Notification Received Inquiry 66 is only reached if the action is an asynchronous action that does not involve human interaction, but instead involves interaction with a separate process or thread. While human playback events can not be played back automatically because they require human involvement during playback, this type of asynchronous event can be played back automatically. This type of inter-process communication event (IP Event) is made reproducible by having two functions communicate via global variables. The two functions are Play Next Event Function P1, and the IP Event Notification Function P2. Since every event contains a unique identifier, these two functions communicate by storing globally the unique identifier for the IP event.

For instance, if the next event in the Serial Event Log 42 is an IP Event, but the corresponding IP Event Notification 68 has not been received yet, then the Gate 52 is closed and this IP Event is stored in a global list. When the IP Event Notification 68 is passed to the IP Event Notification Function P2, then the Gate 52 will be opened and playback will continue.

However, if the IP Event Notification 68 has already been received when the IP Event is played back from the Serial Event Log 42, then the IP Event Playback Function 70 is called and the Gate 52 is left open.

Figure 6:
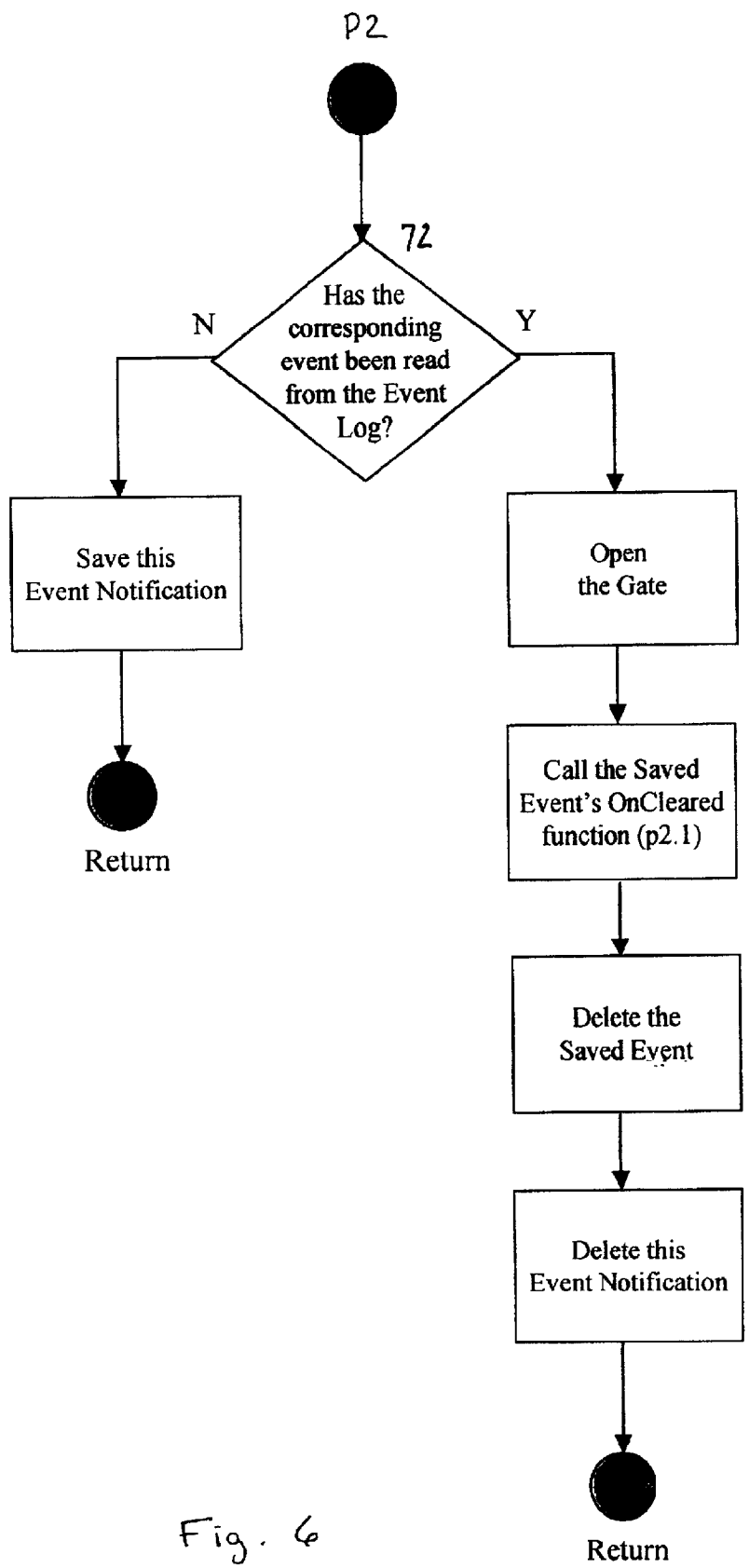

Also in the preferred embodiment of the present invention, the IP Event Notification Function P2 in FIGS. 6 & 8 is called when an IP Event Notification 68 is received by the application during playback. For instance, if the run of the application causes it to pass data to another process or thread, this IP Event Notification Function P2 is called when the other process or thread responds to the main process.

Referring to FIGS. 6 & 8, the IP Event Inquiry 72 determines: "Has the corresponding IP Event been read from the Serial Event Log 42?" If it has, then this IP Event Notification Function P2 will call the IP Event Playback Function 70 for this IP Event and open the Gate 52. The Play Next Event Function P1 will have closed the Gate 52 when the event was read from the Serial Event Log 42.

If the corresponding IP Event has not yet been read from the Serial Event Log 42, however, then the IP Event Notification Function P2 will save this IP Event Notification 68 in a global list and return without calling the IP Event Playback Function 70.

Figure 7:
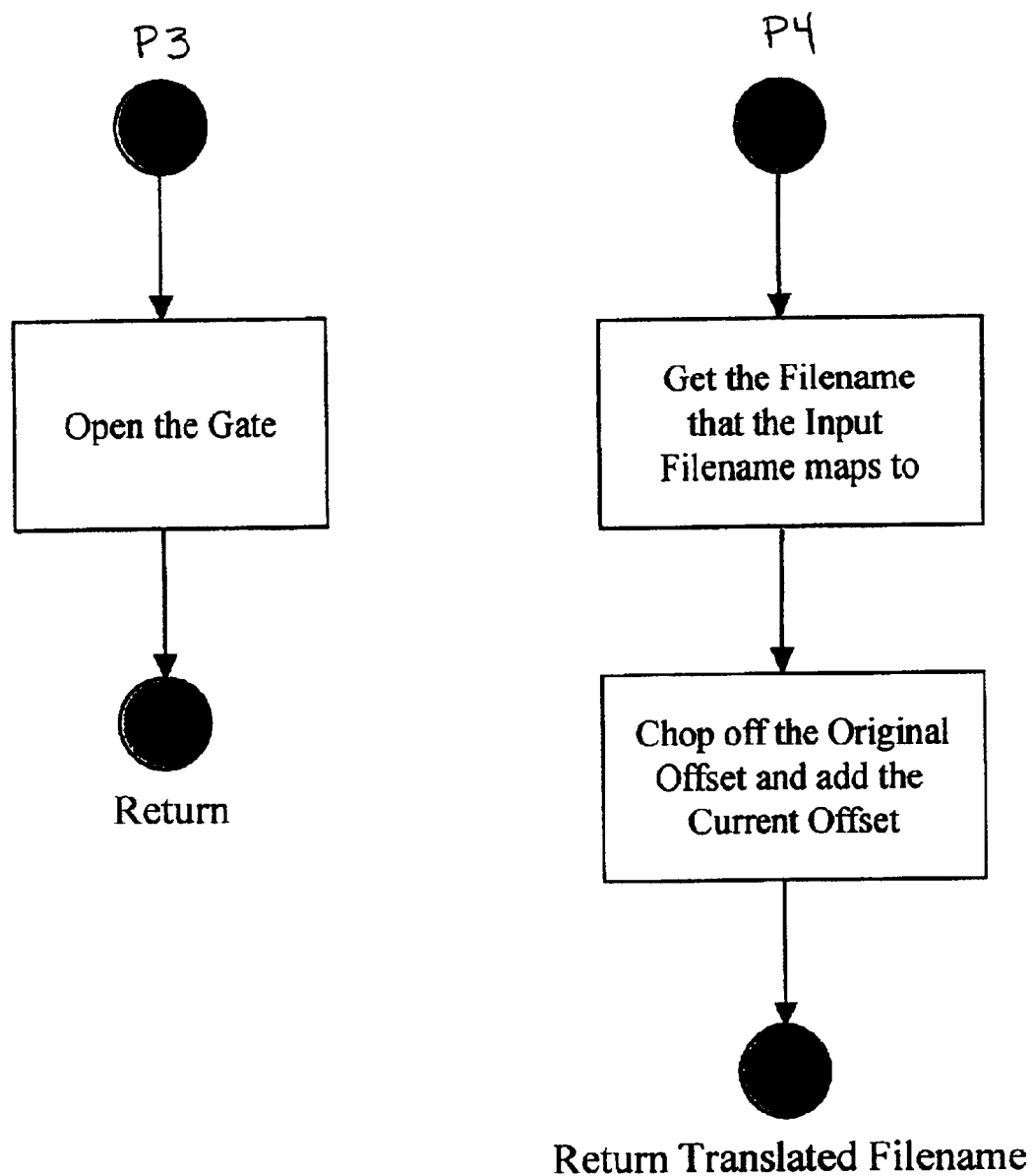

Referring now to FIGS. 7 & 8, the Gate Open Function P3 is called by the application when a human playback event has been completed by the user. In a typical GUI application, this Gate Open Function P3 is called when the user presses the "OK" button on the dialog that is displayed when Play Next Function P1 calls the On Human Playback Virtual Function 64.

For command-line applications the effect is the same, although the On Human Playback Virtual Function 64 will not display a dialog. Rather, the On Hunan Playback Virtual Function 64 displays a message to the user instructing the user to perform the human playback event. The user is then automatically instructed to enter special text to indicate that the event has been performed.

Still referring to FIGS. 7 & 8, the preferred embodiment of the present invention includes a User-Changeable Data Playback Function P4. This User-Changeable Data Playback Function P4 is called by the application when it wants to read a file that contains user-changeable data. For instance, a paint application will call the User-Changeable Data Playback Function P4 when reading a user's picture files, but would not call this function when reading static files such as application-specific startup files because static files don't change as a result of application usage, but only change when new versions of the application are released.

This User-Changeable Data Playback Function P4 takes as an argument the filename that the application is expecting to read, in other words, the filename that was actually read during the original run of the application. The return value of this function is the filename that the application should actually read during playback. Therefore, this function consults the File Map maintained by the Play Next Event Function P1.

However, this function doesn't simply return the filename to which the file map maps the input filename. Because the file map maps the input filename to the file copy that was saved during the original run of the application. Instead, during playback, this User-Changeable Data Playback Function P4 must perform transformation on the filename stored in the file map. Because the actual location of the file copy may be different during playback than it was during the original run of the application, this User-Changeable Data Playback Function P4 will replace the beginning part of the mapped-to file path (the location of the file bundle during the original run of the application) with the location of the file bundle during playback.

One example of how the User-Changeable Data Playback Function P4 operates is given below. If during playback the location of the file bundle (the copy of files read and written) is:

C:\Jim\PaintFiles\sst_log\log_D000102, but during playback the location of the file bundle is:

D:\Joe\Testcases\testcase24, then if the mapped-to filename is:

C:\Jim\PaintFiles\sst_log\log_
D000102\C\Jim\PaintFiles\landscape1.bmp, then during playback this function will return:

D:\Joe
Testcases\testcase24\C\Jim\PaintFiles\landscape1.bmp.

This enables the application to read an exact copy of the file that was read during the original run of the application, which is required to enable reproducibility for the application. However, it is advantageous to also store the files that are written by the application during the original run and automatically compare them to files that are written during playback. Therefore, in the preferred embodiment of the present invention, zero-effort setup for reproducibility of all runs of any software program is achieved, including those with asynchronous properties. This means that a user can automatically restart the application and provide it with all the data required to replay any and all specific runs of the program.

For typical GUI applications, in which all individual events of the application are automatically replayable, the preferred embodiment of the present invention can in fact automatically replay all runs of the application. For an application that has any non-automatically replayable events, the preferred embodiment of the present invention will not be able to automatically replay the runs of the application that use any of those non-automatically replayable events. The present invention can still guarantee automatic setup and restarting of the application for playback of all runs of the program.

Although a human would have to be involved during playback for runs of the application which have any non-automatically replayable events, the preferred embodiment of the present invention guarantees that a human never has to be involved in the setup of the data to begin the playback of the run of the program. This is the main reason why this invention is so important to the software development process. Currently, some human effort is required to develop reproducible test cases for software errors. The preferred embodiment of the present invention eliminates this dependence on human effort and guarantees automatic creation of test cases (Serial Event Logs 42) for all runs of any application. Although a human may sometimes be involved to actually replay the test case, it is not much of a burden because a human must be involved to actually fix the software error regardless. The creation of the reproducible test case completely automates the part of the software error fixing process that, in theory, does not require human involvement.

It will be readily apparent to one skilled in the art that other various modifications may be made to the preferred embodiment without departing from the spirit and scope of the invention as defined by the appended claims.

What is claimed is:

1. A method of action synchronization for software reproducibility to add stability and control to software quality, the method comprising the steps of:
   a. recording a plurality of non-file events and a plurality of file events from a computer application;
   b. playing a next event from a serial event log; and
   c. copying the one of a plurality of file events to an I/O file bundle when recording one of the file events from the computer application.

2. The method of claim 1 further comprising when recording one of a plurality of non-file events from the computer application, the step of storing the one of a plurality of non-file events in the serial event log.

3. The method of claim 1 further comprising the step of storing the one of a plurality of file events in the serial event log.

4. The method of claim 1 further comprising when playing the next event from the serial event log, the step of calling an onplayback function of the next event when the next event is a basic synchronous event.

5. The method of claim 4 further comprising the step of deleting the basic synchronous event.

6. The method of claim 1 further comprising when playing the next event from the serial event log, the step of updating a file map with the next event when the next event is a file event.

7. The method of claim 6 further comprising the step of deleting the file event.

8. The method of claim 1 further comprising when playing the next event from the serial event log, the step of closing a gate when the next event is a human playback event.

9. The method of claim 8 further comprising the step of calling an onhuman playback function of the human playback event.

10. The method of claim 9 further comprising the step of deleting the human playback event.

11. The method of claim 1 further comprising when playing the next event from the serial event log, the step of calling an oncleared function when a notification is received.

12. The method of claim 11 further comprising the step of deleting the notification.

13. The method of claim 1 further comprising when playing the next event from the serial event log, the step of closing a gate when the next event is one of the plurality of non-file events.

14. The method of claim 13 further comprising the step of saving the next event.

15. The method of claim 1 further comprising when playing the next event from the serial event log, the step of opening a gate when the next event is an inter process event notification.

16. The method of claim 15 further comprising the step of calling an oncleared event of a saved inter process event, wherein the saved inter process event corresponds with the inter process event notification.

17. The method of claim 16 further comprising the step of deleting the saved inter process event.

18. The method of claim 17 further comprising the step of deleting the inter process event notification.

19. The method of claim 1 further comprising the step of saving an inter process event notification when the inter process event notification is not read from the serial event log.

20. The method of claim 1 further comprising the step of opening a gate when a user completes a human playback event.

21. The method of claim 1 further comprising the step of obtaining a filename to which an input filename maps.

22. The method of claim 21 further comprising the step of removing an original offset from the filename.

23. The method of claim 22 further comprising the step of adding a current offset to the filename and returning the filename.

24. An article of manufacture comprising a computer readable medium bearing program code embodied therein for use with a computer, the computer program code including:
   a. means for recording a plurality of non-file events and a plurality of file events from a computer application;
   b. means for playing a next event from a serial event log; and
   c. means for copying the one of a plurality of file events to an I/O file bundle when the recording means are recording one of a plurality of file events from a computer application.

25. The article of manufacture of claim 24 further including when recording one of a plurality of non-file events from the computer application, means for storing the one of a plurality of non-file events in the serial event log.

26. The article of manufacture of claim 24 further including means for storing the one of a plurality of file events in the serial event log.

27. The article of manufacture of claim 24 further including when playing the next event from the serial event log, means for calling an onplayback function of the next event when the next event is a basic synchronous event.

28. The article of manufacture of claim 27 further including means for deleting the basic synchronous event.

29. The article of manufacture of claim 24 further including when playing the next event from the serial event log, means for updating a file map with the next event when the next event is a file event.

30. The article of manufacture of claim 29 further including means for deleting the file event.

31. The article of manufacture of claim 24 further including when playing the next event from the serial event log, means for closing a gate when the next event is a human playback event.

32. The article of manufacture of claim 31 further including means for calling an onhuman playback function of the human playback event.

33. The article of manufacture of claim 32 further including means for deleting the human playback event.

34. The article of manufacture of claim 24 further including when playing the next event from the serial event log, means for calling an oncleared function when a notification is received.

35. The article of manufacture of claim 34 further including means for deleting the notification.

36. The article of manufacture of claim 24 further including when playing the next event from the serial event log, means for closing a gate when the next event is one of the plurality of non-file events.

37. The article of manufacture of claim 36 further including means for saving the next event.

38. The article of manufacture of claim 24 further including when playing the next event from the serial event log, means for opening a gate when the next event is an inter process event notification.

39. The article of manufacture of claim 38 further including means for calling an oncleared event of saved inter process event, wherein the saved inter process event corresponds with the inter process event notification.

40. The article of manufacture of claim 39 further including means for deleting the saved inter process event.

41. The article of manufacture of claim 40 further including means for deleting the inter process event notification.

42. The article of manufacture of claim 24 further including means for saving an inter process event notification when the inter process event notification is not read from the serial event log.

43. The article of manufacture of claim 24 further including means for opening a gate when a user completes a human playback event.

44. The article of manufacture of claim 24 further including means for obtaining a filename to which an input filename maps.

45. The article of manufacture of claim 44 further including means for removing an original offset from the filename.

46. The article of manufacture of claim 45 further including means for adding a current offset to the filename and returning the filename.

47. An apparatus for action synchronization for software reproducibility to add stability and control to software quality comprising:
   a. a storage media for storing a computer application;
   b. a processing unit coupled to the storage media; and
   c. a user interface coupled to the processing unit such that a user can record a plurality of non-file events and a plurality of file events from the computer application and subsequently play a next event from a serial event log, wherein one of a plurality of file events is copied to an I/O bundle when the user records one of the file events from the computer application.

48. A method of action synchronization for software reproducibility to add stability and control to software quality, the method comprising the steps of:

a. recording a plurality of non-file events and a plurality of file events from a computer application;

b. playing a next event from a serial event log;

c. copying the one of a plurality of file events to an I/O file bundle when recording one of the file events from the computer application; and d. when playing the next event from the serial event log, closing a gate when the next event is a human playback event.

* * * * *